(12) United States Patent
Nonaka et al.

(10) Patent No.: US 6,457,381 B1
(45) Date of Patent: Oct. 1, 2002

(54) REVERSING DEVICE FOR VEHICLE

(75) Inventors: Takehiro Nonaka, Saitama (JP); Yukimi Ase, Saitama (JP); Yoji Kanaoka, Saitama (JP); Koichi Shimamura, Saitama (JP); Yoshifumi Mochizuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 13 days.

(21) Appl. No.: 09/801,754

(22) Filed: Mar. 9, 2001

(30) Foreign Application Priority Data

Oct. 3, 2000 (JP) .......................................... 2000-067225

(51) Int. Cl.[7] .............................................. F16H 37/06
(52) U.S. Cl. ........................................... 74/661; 74/342
(58) Field of Search ........................... 74/661, 342, 325, 74/810.1; 477/2; 200/61.54; F16H 59/12

(56) References Cited

U.S. PATENT DOCUMENTS

| 4,347,813 A | * | 9/1982 | Maucher et al. ....... 123/179.22 |
| 4,763,538 A | * | 8/1988 | Fujita et al. ........... 123/179.25 |
| 4,827,148 A | * | 5/1989 | Hirosawa et al. ......... 290/38 R |
| 4,869,332 A | * | 9/1989 | Fujita et al. ................ 180/219 |
| 4,870,874 A | * | 10/1989 | Ito ............................. 180/219 |
| 5,024,113 A | * | 6/1991 | Ito et al. .................. 123/179.1 |
| 6,054,826 A | * | 4/2000 | Murakami et al. .......... 318/434 |
| 6,076,416 A | * | 6/2000 | Sputhe ........................ 74/342 |
| 6,267,192 B1 | * | 7/2001 | Maier et al. ................ 180/219 |

FOREIGN PATENT DOCUMENTS

JP            285426        1/1996

* cited by examiner

*Primary Examiner*—Jack Lavinder
*Assistant Examiner*—Devon Kramer
(74) *Attorney, Agent, or Firm*—Birch, Stewart, Kolasch & Birch, LLP

(57) ABSTRACT

A shifter motor is provided as an actuator for shifting between a gear for reversing a vehicle by a starter motor and a mode for starting an engine with the starter motor. A switch panel is provided adjacent to a handle grip, and a starter/reverse switch for controlling the starter motor and a reverse shift switch for controlling a shifter motor are disposed adjacent to each other on an operation surface of the switch panel. By the positions of the switches, the rider can perform operations for reversing the vehicle with one hand.

18 Claims, 4 Drawing Sheets

REVERSING DEVICE FOR VEHICLE

BACKGROUND OF THE INVENTION

1. Field of the Invention

The present invention relates to a reversing device for a vehicle. In particular, the present invention relates to a reversing device for a vehicle capable of controlling a starter motor with easy switch operations and reversing the vehicle by a driving force of the starter motor.

2. Description of Background Art

In vehicles in which a driver gets astride a saddle, such as a large-sized two-wheeled motor vehicle or a tricycle for leisure (hereinafter referred to as "saddle type vehicle"), there has been known one which can reverse itself by a driving force of a starter motor (for example, Japanese Patent Publication No. Hei 8-5426). FIG. 7 is a perspective view of a two-wheeled motor vehicle with a reversing device according to the background art. A fuel tank 5 is disposed on the front side of a seat 6 provided at a central portion of the vehicle. A vehicle-reversing lever 40 is provided on the upper side of an engine 9 on the left lower side of the fuel tank 5. In addition, a starter/reverse switch 121 for the engine is provided in the vicinity of the grip of a right handle 1R at a front portion of the vehicle.

In the above-mentioned two-wheeled motor vehicle, when the vehicle is to be reversed, the following operations are made. First, the starter/reverse switch 121 is pressed to start the engine 9. At this time, a speed change gear is in a neutral condition. Next, the driver (rider) unlocks, and turns to the reversing direction, a reversing lever 40 located near the left knee by the left hand, and locks the reversing lever 40 in a predetermined position. This lever operation changes over the speed change gear to a reverse gear. Then, the starter/reverse switch 121 is pressed by the right hand, whereon a driving force of the starter motor reverses the vehicle because the speed change gear is in its reverse gear. After the vehicle is reversed to a desired position, the hand is detached from the starter/reverse switch 121 to stop the vehicle. Finally, the reversing lever 40 is unlocked, is turned in a direction opposite to the reversing direction, and is locked. This operation brings the speed change gear back to the neutral position.

As described above, the two-wheeled motor vehicle according to the background art has a problem in that the operation for reversing the vehicle is complicated. Namely, the rider normally grips the steering handle by both hands, but the operation for reversing the vehicle requires the rider to detach his left hand from the steering handle and to operate the reversing lever. When the vehicle starts reversing, the rider must put his left hand onto the steering handle again, operate the starter/reverse switch by his right hand, and reverse the vehicle while operating the steering handle with both hands. Accordingly, simplification of such a complicated operation as this has been desired.

SUMMARY OF THE INVENTION

It is an object of the present invention to provide a reversing device for a vehicle, which resolves the above-mentioned problems and enables the vehicle to be reversed with a simple operation.

In order to attain the above object, according to a first aspect of the present invention, there is provided a reversing device for a vehicle for allowing a vehicle driven by an engine to be reversed by a driving force of a starter motor for the engine, comprising a first switch provided in common for engine starting purposes and vehicle reversing purposes, the first switch provided on a switch panel disposed adjacent to a steering handle grip of the vehicle, and change-over means for alternative change-over between an engine starting mode and a vehicle reversing mode, wherein the change-over means comprises an actuator for connecting the output side of the starter motor alternatively to a gear on the engine starting side and a gear on the vehicle reversing side, and a second switch for operating the actuator.

In addition, according to a second aspect of the present invention, the first switch and the second switch are disposed adjacent to each other, and the second switch is located farther from the steering handle grip than the first switch.

According to the first characteristic feature, the actuator for connecting the output side of the starter motor alternatively to a gear on the engine starting side and a gear on the vehicle reversing side can be energized by the second switch. Therefore, the second switch can be arbitrarily disposed at a position in consideration of operability for the rider. For example, as described in the second characteristic feature, the first switch is disposed adjacent to the second switch on a switch panel located adjacent to the steering handle grip, whereby the switches can be operated by one hand. Particularly, since the first switch is disposed on the grip side, the rider's task of operating the starter motor can be easily performed while gripping the grip.

In addition, according to a third aspect of the present invention, an operation of the first switch is not accepted during a predetermined period after the second switch is operated. According to the third characteristic feature, even when the two switches are operated simultaneously, the second switch is given priority, whereby the engine starting by the starter motor is accepted after the mode is changed over assuredly.

Furthermore, according to a fourth aspect of the present invention, the switch panel comprises a first panel surface on which the first switch is fitted and a second panel surface on which the second switch is fitted, and a step is provided between the first panel surface and the second panel surface so that the second panel surface of the two panel surfaces is closer to the rider. According to the fourth characteristic feature, the positions of the first switch and the second switch are clearly discriminated even though the two switches are disposed close to each other, so that the rider can easily recognize the two switches and operability is more enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 3:
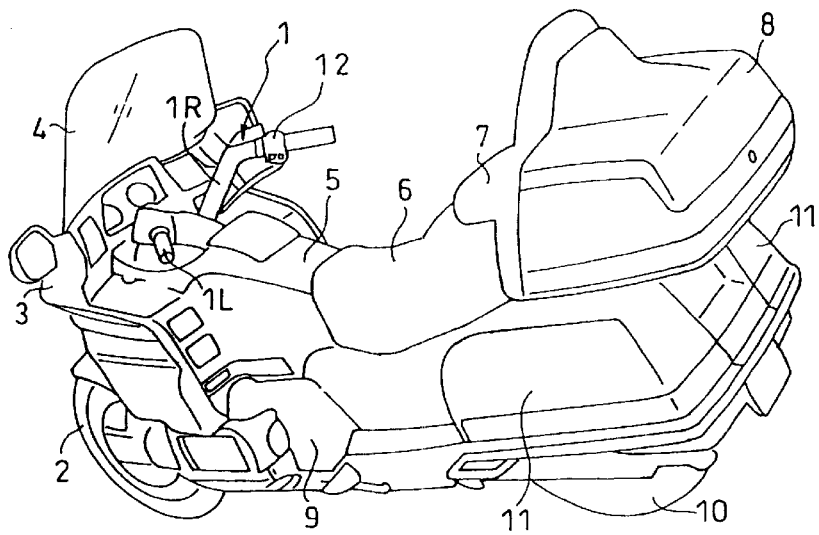
FIG. 3 is a perspective view of a two-wheeled motor vehicle with the reversing device for a vehicle according to one embodiment of the present invention.

One embodiment of the present invention will now be described with reference to the accompanying drawings. FIG. 3 is a perspective view of a two-wheeled motor vehicle, which is one example of a saddle type vehicle with a reversing device for a vehicle according to the embodiment of the present invention. In FIG. 3, a steering handle (hereinafter referred simply to "handle") 1 includes a left handle 1L and a right handle 1R fixed to an upper portion of a front fork (not shown), which axially supports a front wheel 2 at its lower end. A switch panel 12 includes a starter/reverse switch, a reverse shift switch and the like provided in the vicinity of the grip of the right handle 1R. A front fairing 3 covering a display panel and light devices is provided on the front side of the handle 1, and a windshield screen 4 is attached to an upper portion of the front fairing 3.

A fuel tank 5, a driver's seat 6, a passenger's seat 7 and a rear box 8 are arranged in this order from the front fairing 3 to the rear side of the vehicle. An engine 9 is provided on the lower side of the fuel tank 5, a rear wheel 10 is located on the lower side of the rear box 8, and side boxes 11 are disposed so as to cover the left and right sides of an upper portion of the rear wheel 10.

Figure 1:
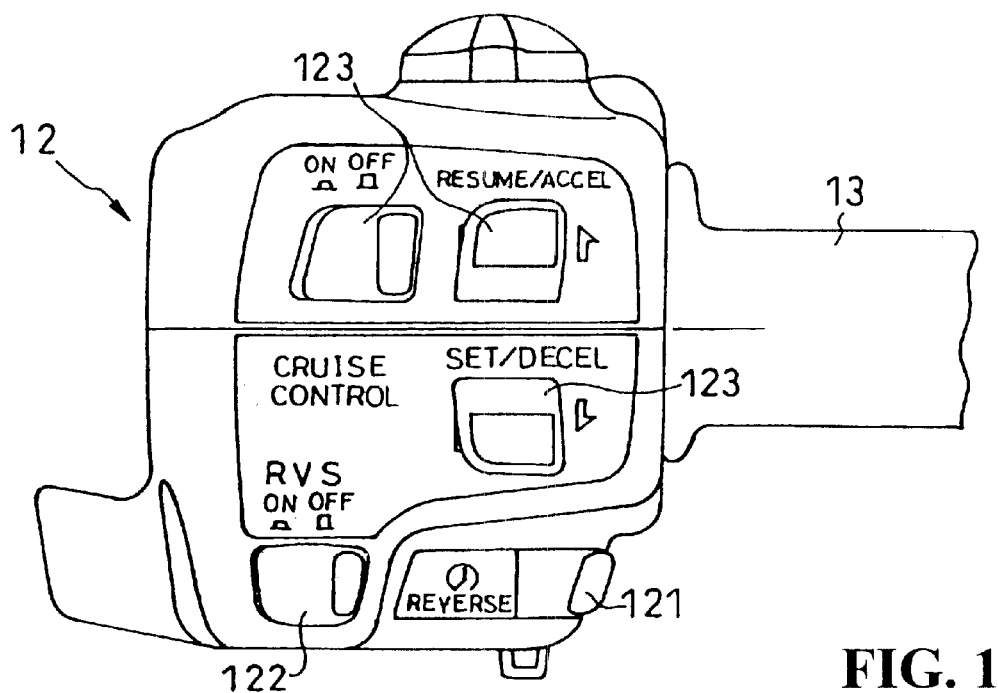
FIG. 1 is a front view of a switch panel of the reversing device for a vehicle according to one embodiment of the present invention.
Figure 2:
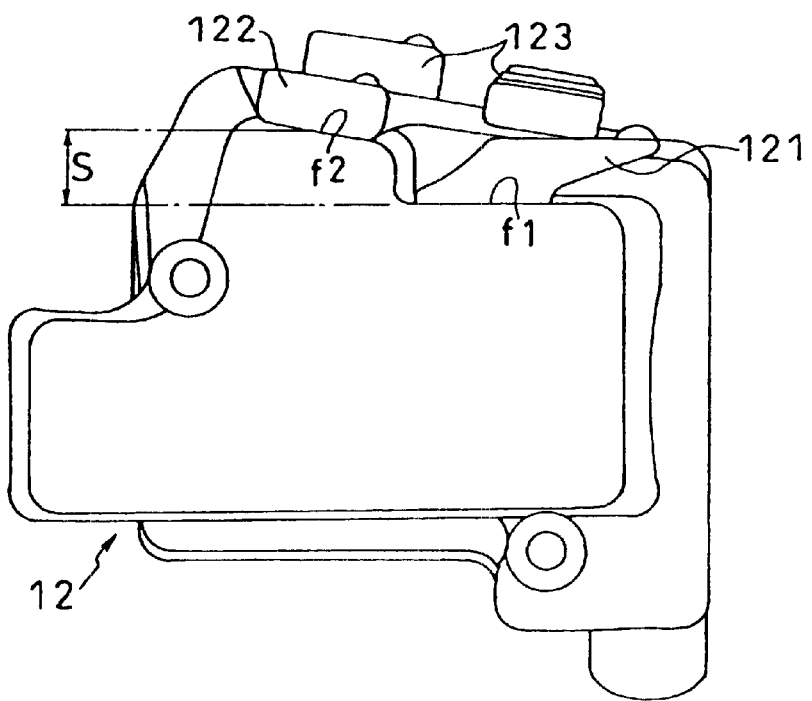
FIG. 2 is a bottom view of the switch panel.

The switch panel 12 provided on the right handle 1R will now be described in detail. FIG. 1 is a front view of the switch panel 12, and FIG. 2 is a bottom view of the switch panel 12. In the Figures, a starter/reverse switch 121 for combined use for engine starting purposes and vehicle reversing purposes is arranged on the right side, or the handle grip 13 side, of a lower portion of the face of the switch panel 12. A reverse shift switch 122 is arranged on the left side, or the vehicle center side, of the starter/reverse switch 121. In addition, a switch 123 for auto-cruising is provided at an upper portion of the face of the switch panel 12.

As can be understood from FIG. 2, the reverse shift switch 122 is located on this side, or the rider's side, while the starter/reverse switch 121 is disposed on the deep side, or the front side of the vehicle, relative to the reverse shift switch 122. Namely, a step S is provided between a fitting surface f1 for the starter/reverse switch 121 and a fitting surface f2 for the reverse shift switch 122. The step S is preferably equal to or greater than the height (size of projection from the fitting surface f1) of the starter/reverse switch 121. Since the starter/reverse switch 121 and the reverse shift switch 122 are arranged with a step therebetween, they can be easily discriminated by the rider through the sense of touch. Accordingly, operability is enhanced. The functions of these switches will be described in more detail below.

Figure 4:
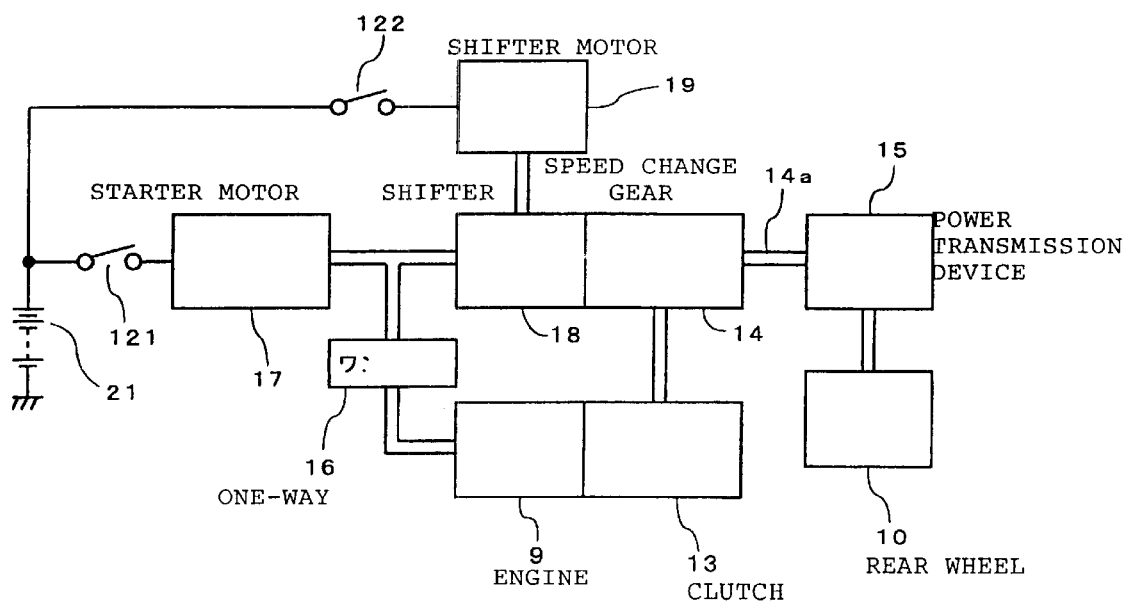
FIG. 4 is a block diagram of a power transmission system of the two-wheeled motor vehicle.

FIG. 4 is a block diagram of a power transmission system. In the Figure, an engine 9 is connected to a multi-stage gearing type speed change gear 14 through a clutch 13. An output shaft 14a of the speed change gear 14 is connected to the rear wheel 10 through a power transmission device 15 comprising sprockets and chains. When the engine 9 is operating and the clutch 13 is engaged, the rear wheel 10 is rotated in a rotating direction and at a speed reduction ratio according to the shift position of the gears in the speed change gear 14.

A starter motor 17 is connected to a crankshaft (not shown) of the engine 9 through a one-way clutch 16, and is connected to a final stage shaft (not shown) of the speed change gear 14 through a shifter 18. The shifter 18 is for shifting the connection of the starter motor 17 to the final stage shaft of the speed change gear 14. A shifter motor (preferably, a servo-motor) 19 as an actuator for controlling the shifter 18 is provided. The starter motor 17 is connected to a power source 21 through the starter/reverse switch (first switch) 121, while the shifter motor 19 is connected to a power source (battery) 21 through the reverse shift switch (second switch) 122.

Figure 5:
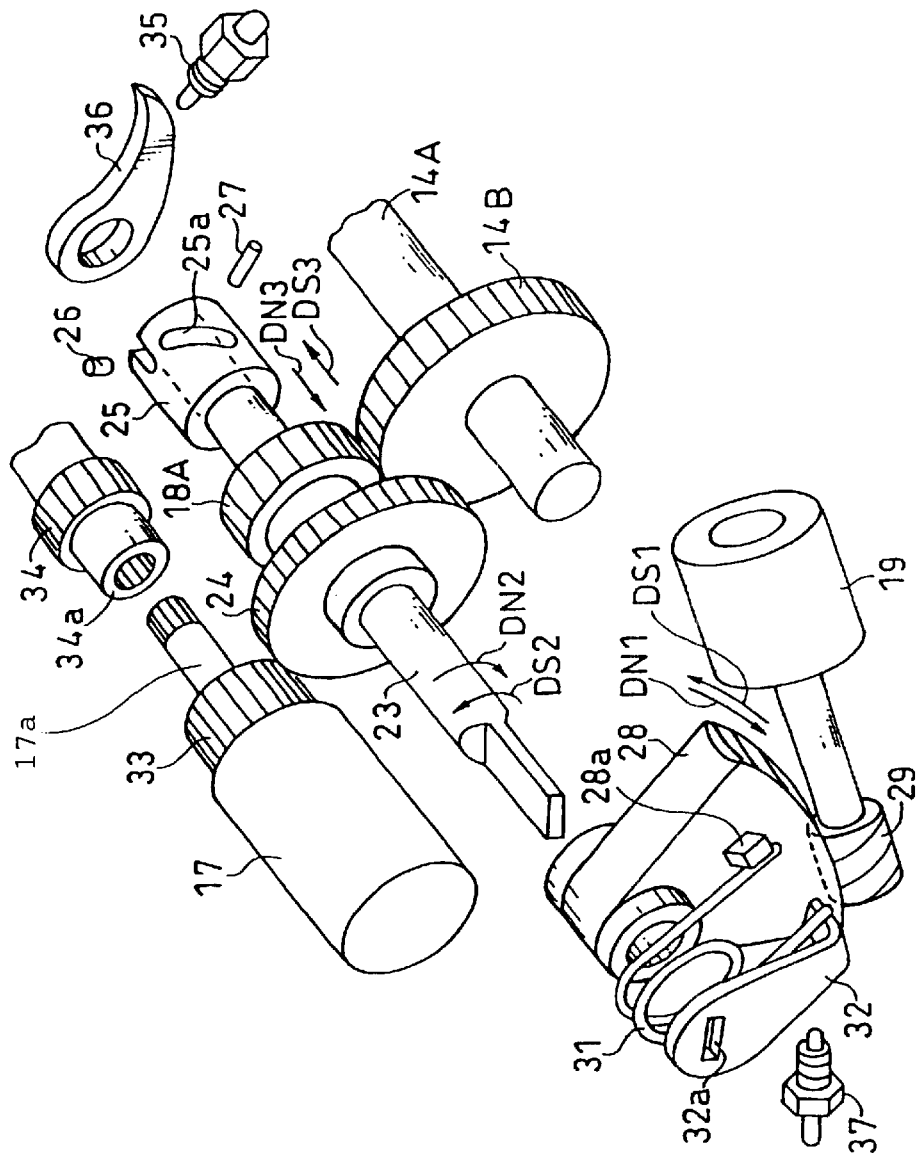
FIG. 5 is a perspective view of a major part of a shifter for shifting between an engine starting mode and a vehicle reversing mode.

FIG. 5 is a perspective view of a major portion of the shifter 18. In the Figure, a reverse idle gear 24 and a shifter gear 18A are fitted to a reverse shaft 23 supported by a crankcase (not shown). The reverse idle gear 24 and the shifter gear 18A are coupled to each other or formed as one body with each other, and they are circumferentially slidable relative to the reverse shaft 23, but are positionally fixed in the axial direction. At a reverse position, the shifter gear 18A is engaged with a driven gear, namely, a reverse gear 14B fixed to a final stage shaft 14A of the speed change gear 14.

A cam 25 fixed to the crankcase is circumferentially slidably fitted to one end of the reverse shaft 23. The cam 25 is engaged with the crankcase through a pin 26 so that turning of the cam 25 is restricted. A pin 27 fixed to the reverse shaft 23 is loosely fitted in an arc-shaped cam hole 25a.

Actuator means for turning the reverse shaft 23 is provided at the other end of the reverse shaft 23. The actuator means comprises a partial worm wheel 28 loosely engaged with the reverse shaft 23, a worm 29 engaged with the worm wheel 28, a shifter motor 19 for turning the worm 29, a lost motion spring 31 for elastically energizing the worm wheel 28 in one of two turning directions, and a plate 32 which has a slot 32a for loose engagement with a rectangular sectional portion of an end portion of the reverse shaft 23 and is engaged with one end of the lost motion spring 31. In addition, a projection 28a for engaging with the other end of the lost motion spring 31 is provided on a side surface of the worm wheel 28.

The reverse idle gear 24 is engaged with a reverse drive gear 33 connected to a shaft 17a of the starter motor 17. The tip of the shaft 17a of the starter motor 17 is spline coupled to a shaft 34a of a starter drive gear 34 for transmitting the rotation of the starter motor 17 to a crankshaft.

A position switch 35 for displaying a reverse mode upon detecting that the shifter gear 18A has been moved to a predetermined position is provided at one end of the reverse shaft 23. A cam 36 fixed to the reverse shaft 23 energizes the position switch 35. The position switch 35 turns on a display light, which can be provided on a display panel in the vicinity of the handle 1.

In addition, a servo position switch 37 is disposed facing the worm wheel 28. The servo position switch 37 detects the condition when the worm wheel 28 is located at a predetermined position, thereby sensing that the worm wheel 28 has been located at one end of stroke. Based on this detected position, the drive of the shifter motor 19 is controlled.

The shifter 18 operates as follows. When the shifter motor 19 is driven to rotate the worm 29, the worm wheel 28 is turned in the direction of arrow DN1 or DS1. The turning of the worm wheel 28 is transmitted to the plate 32 through the lost motion spring 31, whereby the reverse shaft 23 engaged with the plate 32 is turned in the direction of arrow DN2 or DS2. With the reverse shaft 23 turned, the pin 27 is guided along the cam hole 25a, and the reverse shaft 23 is linearly moved in the direction of arrow DN3 or DS3 accordingly.

In FIG. 5, gears are shifted to a reverse position for reversing the vehicle. Namely, the worm wheel 28 is turned in the direction of arrow DS1, and the reverse shaft 23 is displaced in the direction of arrow DS3, whereby the shifter gear 18A is engaged with the reverse gear 14B of the speed change gear 14. When the starter motor 17 is driven in this reverse position, the rotation of the starter motor 17 is transmitted through the reverse drive gear 33, the idle gear 24 and the shifter gear 18A to the reverse gear 14B, whereby the vehicle is reversed.

On the other hand, when the starter motor 7 is disengaged from the reverse gear 14B, namely, shifted to a neutral position, the worm wheel 28 is turned in the direction of arrow DN1, and the reverse shaft 23 is displaced in the direction of arrow DN3, whereby the shifter gear 18A and the reverse gear 14B are disengaged from each other. The means for turning the reverse shaft 23 is not limited to the combination of worm and worm wheel, but may be, for example, such a system in which a drum disposed coaxially with the reverse shaft 23 is turned by a cable.

The procedure for reversing the vehicle by the reversing device having the shifter is as follows. It is considered that the shifter is in a neutral position in the initial condition. First, the starter/reverse switch 121 is pressed to rotate the starter motor 17, thereby starting the engine 9. Next, the reverse shift switch 122 is pressed to engage the shifter gear 18A with the reverse gear 14B, thereby shifting the gearing to the reverse position. Then, the starter/reverse switch 121 is pressed to rotate the starter motor 17, whereby the rotation is transmitted to the reverse gear 14B and the vehicle is reversed. Since the vehicle is reversed while the starter/reverse switch 121 is pressed, stopping of the pressing of the starter/reverse switch 121 causes the vehicle to stop. When the vehicle is stopped and the reverse shift switch 122 is pressed again, the shifter gear 18A and the reverse gear 14B are disengaged from each other, and the gearing is shifted to the neutral position.

In addition, timer means may be provided for not accepting an instruction from the starter/reverse switch 121 during a predetermined period after the reverse shift switch 122 is pressed. This is for an assured operation. The timer means may be provided in a controller (controlled by a microcomputer) for performing predetermined processing in response to the detection of ON and OFF states of the switches 121, 122.

Figure 6:
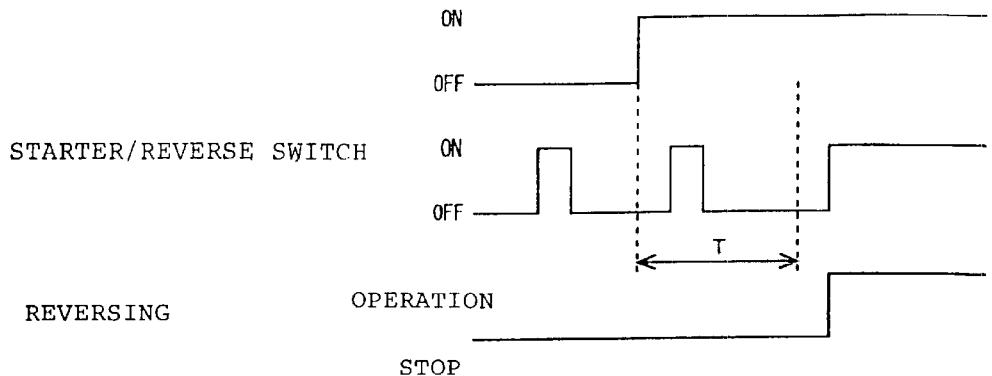
FIG. 6 is a timing chart of switch operations for the reversing device of a vehicle.
Figure 7:
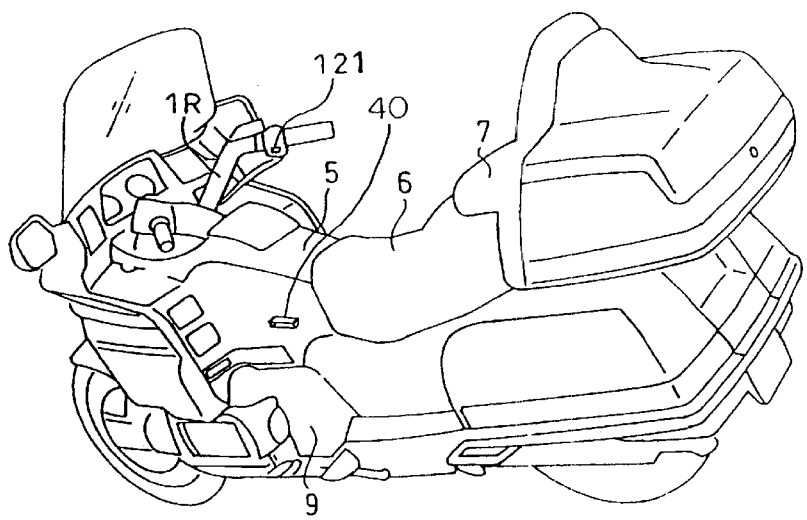
FIG. 7 is a perspective view of a two-wheeled motor vehicle with a reversing device for vehicle according to the background art.

FIG. 6 is a timing chart of the ON and OFF states of the switches 121, 122 and the reversing motion of the vehicle. As shown in this Figure, when the starter/reverse switch 121 is turned ON in the condition where the shifter 18 is in the reverse position, the vehicle is reversed. However, after the reverse shift switch 122 is turned ON but a predetermined time T has not yet passed, the vehicle is not reversed even if the starter/reverse switch 121 is turned ON. The time T is preferably on the order of 0.2 to 1 second, for example.

As is clear from the above description, according to the first through fourth aspects of the present invention, operating two switches can easily reverse the vehicle. Particularly, according to the second aspect of the present invention, since the two switches are concentratedly arranged in the vicinity of the grip on one side, the rider can perform the operation for reversing the vehicle by one hand. According to the third and fourth aspects of the present invention, the operations on the first and second switches or actions based on the operations can be clearly distinguished, so that ease of operation and assuredness are enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reversing device for a vehicle for allowing a vehicle driven by an engine to be reversed by a driving force of a starter motor for the engine, comprising:
   a first switch provided in common for engine starting and vehicle reversing purposes, said first switch being provided on a switch panel disposed adjacent to a steering handle grip of the vehicle; and
   a change-over device for alternative change-over between an engine starting mode and a vehicle reversing mode, said change-over device including:
      an actuator for connecting an output side of the starter motor alternatively to a gear on an engine starting side and a gear on a vehicle reversing side; and
      a second switch for operating said actuator.

2. The reversing device according to claim 1, wherein said first switch and said second switch are disposed adjacent to each other, and said second switch is located further from the steering handle grip than said first switch.

3. The reversing device according to claim 1, further comprising a device for preventing operation of said first switch during a predetermined period after said second switch is operated.

4. The reversing device according to claim 2, further comprising a device for preventing operation of said first switch during a predetermined period after said second switch is operated.

5. The reversing device according to claim 1, wherein said switch panel comprises a first panel surface on which said first switch is fitted and a second panel surface on which said second switch is fitted, and a step is provided between said first panel surface and said second panel surface so that said second panel surface is closer to a rider of the vehicle than said first panel surface.

6. The reversing device according to claim 2, wherein said switch panel comprises a first panel surface on which said first switch is fitted and a second panel surface on which said second switch is fitted, and a step is provided between said first panel surface and said second panel surface so that said second panel surface is closer to a rider of the vehicle than said first panel surface.

7. The reversing device according to claim 3, wherein said switch panel comprises a first panel surface on which said first switch is fitted and a second panel surface on which said second switch is fitted, and a step is provided between said first panel surface and said second panel surface so that said second panel surface is closer to a rider of the vehicle than said first panel surface.

8. The reversing device according to claim 4, wherein said switch panel comprises a first panel surface on which said first switch is fitted and a second panel surface on which said second switch is fitted, and a step is provided between said first panel surface and said second panel surface so that said second panel surface is closer to a rider of the vehicle than said first panel surface.

9. A vehicle, comprising:
   a steering handle having a steering handle grip mounted thereon;
   an engine;
   a starter motor;
   a reversing device including a first switch provided in common for engine starting and vehicle reversing purposes, said first switch being provided on a switch panel disposed adjacent to said steering handle grip, and a change-over device for alternative change-over between an engine starting mode and a vehicle reversing mode, said change-over device including:
      an actuator for connecting an output side of said starter motor alternatively to a gear on the engine starting side and a gear on the vehicle reversing side; and
      a second switch for operating said actuator.

10. The vehicle according to claim 1, wherein said first switch and said second switch are disposed adjacent to each other, and said second switch is located further from said steering handle grip than said first switch.

11. The vehicle according to claim 9, further comprising a device for preventing operation of said first switch during a predetermined period after said second switch is operated.

12. The vehicle according to claim 10, further comprising a device for preventing operation of said first switch during a predetermined period after said second switch is operated.

13. The vehicle according to claim 9, wherein said switch panel comprises a first panel surface on which said first switch is fitted and a second panel surface on which said second switch is fitted, and a step is provided between said first panel surface and said second panel surface so that said second panel surface is closer to a rider of the vehicle than said first panel surface.

14. The vehicle according to claim 10, wherein said switch panel comprises a first panel surface on which said first switch is fitted and a second panel surface on which said second switch is fitted, and a step is provided between said first panel surface and said second panel surface so that said second panel surface is closer to a rider of the vehicle than said first panel surface.

15. The vehicle according to claim 11, wherein said switch panel comprises a first panel surface on which said first switch is fitted and a second panel surface on which said second switch is fitted, and a step is provided between said first panel surface and said second panel surface so that said second panel surface is closer to a rider of the vehicle than said first panel surface.

16. The vehicle according to claim 12, wherein said switch panel comprises a first panel surface on which said first switch is fitted and a second panel surface on which said second switch is fitted, and a step is provided between said first panel surface and said second panel surface so that said second panel surface is closer to a rider of the vehicle than said first panel surface.

17. The vehicle according to claim 9, further comprising a speed change gear, said engine being connected to said speed change gear through a clutch, said speed change gear including an output shaft connected to a rear wheel of the vehicle through a power transmission device.

18. The vehicle according to claim 17, wherein said starter motor is connected to said engine through a one-way clutch and a final shaft of said speed change gear through a shifter, said shifter being actuated by said actuator, and wherein said starter is connected to a power source through said first switch, and said actuator is connected to the power source through said second switch.

* * * * *

UNITED STATES PATENT AND TRADEMARK OFFICE
CERTIFICATE OF CORRECTION

PATENT NO.     : 6,457,381 B1
DATED          : October 1, 2002
INVENTOR(S)    : Takehiro Nonaka et al.

It is certified that error appears in the above-identified patent and that said Letters Patent is hereby corrected as shown below:

<u>Title page,</u>
Item [30], Foreign Application Priority Data, please correct the priority date from "Oct. 3, 2000" to -- March 10, 2000 --.

Signed and Sealed this

Twenty-second Day of April, 2003

JAMES E. ROGAN
*Director of the United States Patent and Trademark Office*